(12) United States Patent
Verma et al.

(10) Patent No.: US 12,205,127 B2
(45) Date of Patent: Jan. 21, 2025

(54) CUSTOMER JOURNEY MANAGEMENT USING MACHINE LEARNING

(71) Applicant: ADOBE INC., San Jose, CA (US)

(72) Inventors: Sukriti Verma, Delhi (IN); Shripad Deshmukh, Maharashtra (IN); Jayakumar Subramanian, Maharashtra (IN); Piyush Gupta, Uttar Pradesh (IN); Nikaash Puri, New Delhi (IN)

(73) Assignee: ADOBE INC., San Jose, CA (US)

( * ) Notice: Subject to any disclaimer, the term of this patent is extended or adjusted under 35 U.S.C. 154(b) by 951 days.

(21) Appl. No.: 17/232,591

(22) Filed: Apr. 16, 2021

(65) Prior Publication Data

US 2022/0335508 A1    Oct. 20, 2022

(51) Int. Cl.
  *G06Q 30/0201* (2023.01)
  *G06N 3/047* (2023.01)
  *G06N 3/08* (2023.01)

(52) U.S. Cl.
  CPC ......... *G06Q 30/0201* (2013.01); *G06N 3/047* (2023.01); *G06N 3/08* (2013.01)

(58) Field of Classification Search
  CPC ...... G06Q 30/0201; G06N 3/047; G06N 3/08; G06N 3/006; G06N 3/0499; G06N 3/09; G06N 3/096; G06N 7/01
  See application file for complete search history.

(56) References Cited

PUBLICATIONS

Daniel A. Brown, et al., "Extrapolating Beyond Suboptimal Demonstrations via Inverse Reinforcement Learning from Observations", Proceedings of the 36th International Conference on Machine Learning, Long Beach, California, PMLR 97, 2019.
Borja Ibarz, "Reward learning from human preferences and demonstrations in Atari", 32nd Conference on Neural Information Processing Systems (NIPS 2018), Montréal, Canada.
Paul F. Christiano, et al., "Deep Reinforcement Learning from Human Preferences", https://arxiv.org/abs/1706.03741 [stat: ML] Jul. 13, 2017.

*Primary Examiner* — Xiao En Mo
(74) *Attorney, Agent, or Firm* — F. Chau & Associates, LLC

(57) ABSTRACT

Interactions between a user and an e-commerce platform are automatically guided to increase the chances of a conversion. Previous sequences of interactions (e.g., conversion journeys and non-conversion journeys) with the e-commerce platform are collected, an artificial neural network (ANN) learns how to estimate a safety value a current user state by learning from previous user interactions (e.g., conversion and non-conversion journeys), a software agent of the e-commerce platform applies a current user state of the user to the ANN to determine a current safety value, and the software agent provides content to the user based on the current safety value and the current user state.

20 Claims, 10 Drawing Sheets

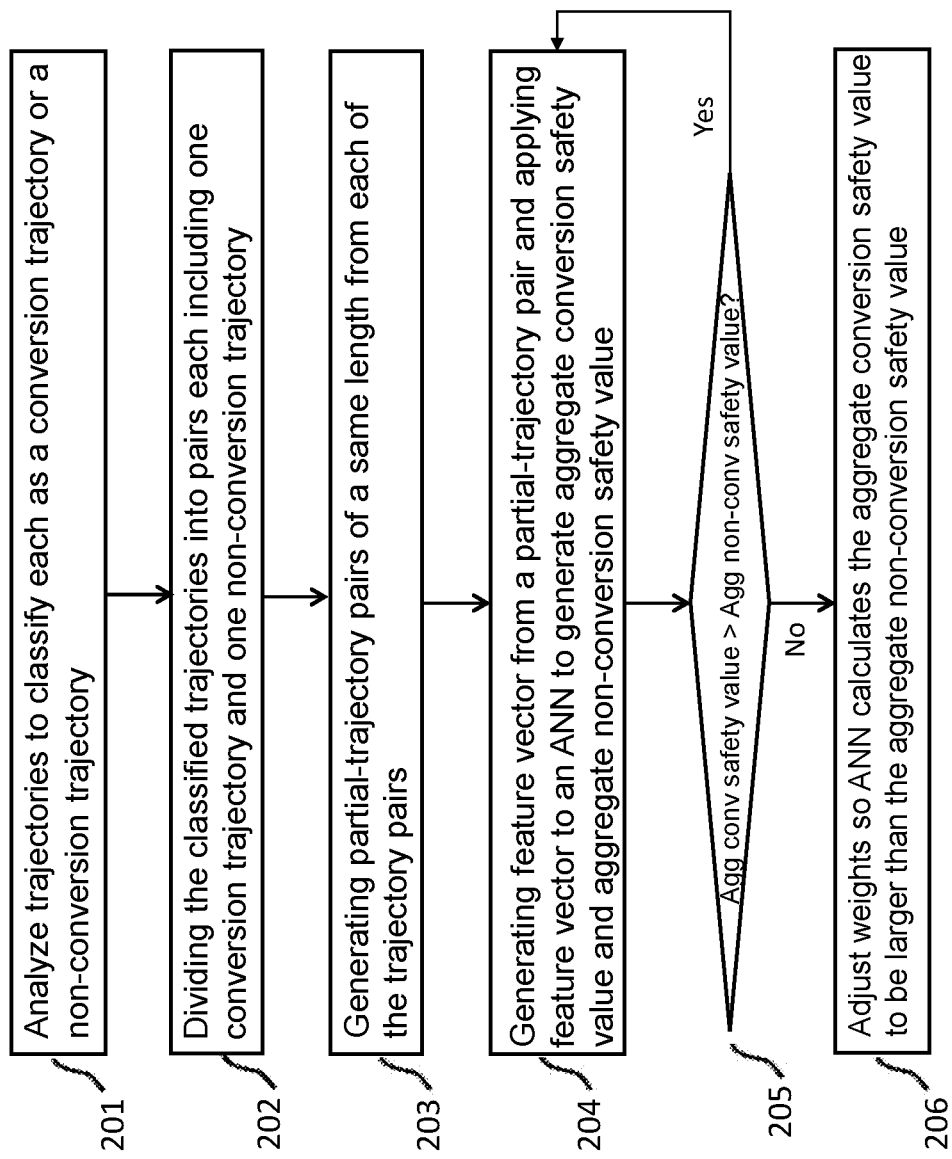

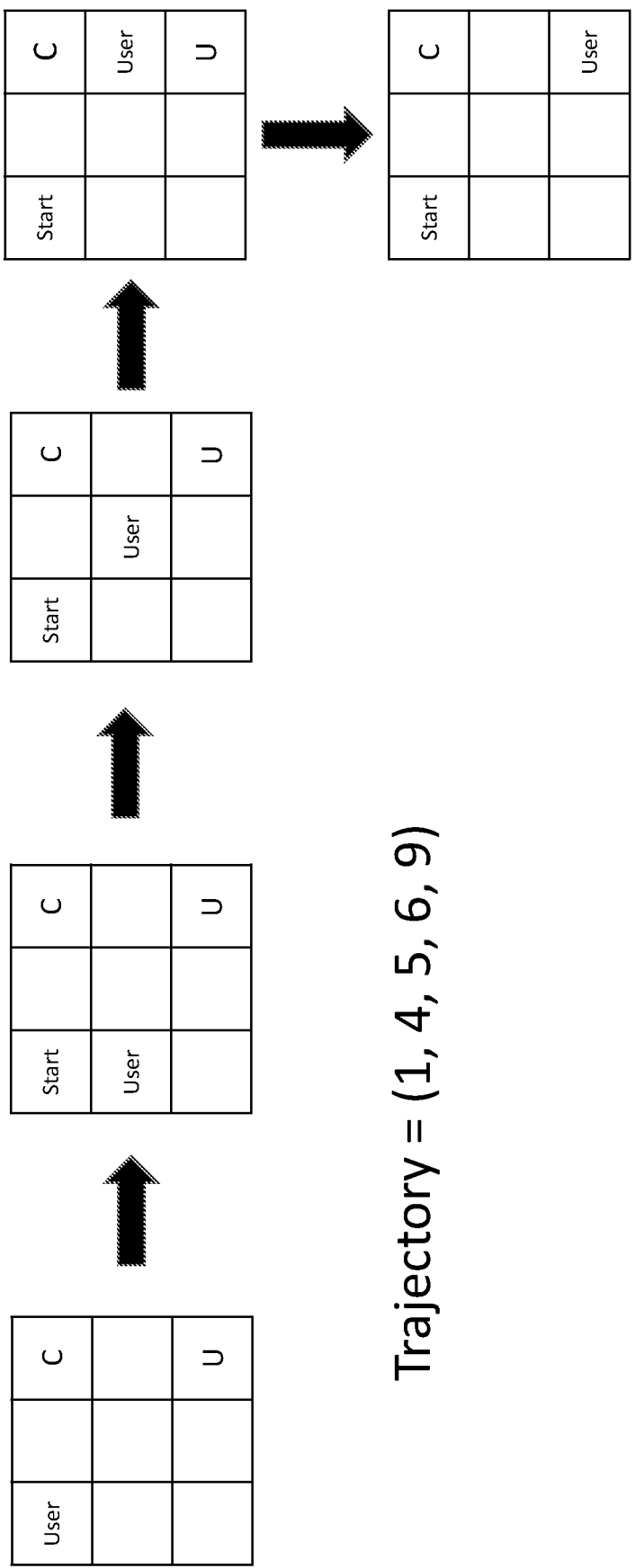

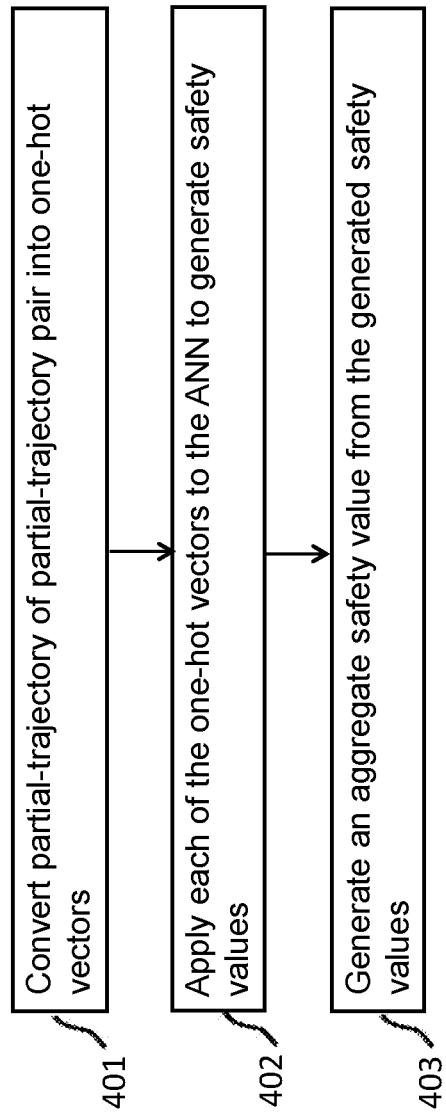

FIG. 5C

Safety_val(state 6) = +0.75

Safety_val(state 9) = +0.95 aggregate safety value for non-conversion partial trajectory = $safety\_val(state\ 6) + \gamma * safety\_val(state\ 9) = 0.75 + 0.9 * 0.95 = 1.605$

CUSTOMER JOURNEY MANAGEMENT USING MACHINE LEARNING

1. TECHNICAL FIELD

This disclosure relates to customer journeys, and more particularly to use of a software agent and machine learning to guide users toward more effective customer journeys.

2. BACKGROUND

A customer experience is the product of an interaction between an organization and a customer over the duration of their relationship. The interaction includes a customer journey, brand touchpoints the customer interacts with, and the environments the customer interacts with during the experience. The customer journey refers to a process a potential customer goes through with a brand. The customer journey may include stages, such as browsing, building a cart, purchase, and post-purchase.

Customer journey mapping analyzes a customer journey to produce a customer journey map that illustrates the story of the customer's experience. The customer journey map is a diagram that illustrates the sequence of steps (or actions) customer(s) go through in engaging with a brand or a company. A sequence that produces a positive result (e.g., conversion) such as a sale may be referred to as a conversion journey and a sequence that results in a negative such as a loss of a sale (e.g., churn) may be referred to as a non-conversion journey.

There are multiple possible steps (or actions) a user can take at any given time from among those provided to the user. For example, if the user is currently on the website of a company, the user could be presented with one or more selectable hyperlinks, one or more selectable popup windows, a text field for entering a query; or sent an advertising message such as an electronic mail (e-mail), a text, a voicemail, etc. The user is considered to be in a safe state (e.g., at a less risky level) when he is likely to perform an action that results in a conversion, and otherwise is considered to be in an unsafe state (e.g., at a riskier level). Knowledge of the current user state of the user and its risk level can be used to steer the user towards performing actions that are more likely to result in a conversion. However, it is difficult to determine the risk level of a user's given state dynamically and accurately.

Therefore, a need exists for a customer journey management strategy that can steer users towards more efficient customer journey sequences.

SUMMARY

Systems, methods, and software are described herein for guiding interactions between a user and an e-commerce platform (e.g., an application, a website, etc.) to increase the chances of a conversion. Previous sequences of interactions (e.g., conversion journeys and non-conversion journeys) with the e-commerce platform are collected, an artificial neural network (ANN) learns how to estimate safety values for user states associated with the previous interactions from pairs of the journeys (e.g., one conversion journey and one non-conversion journey), a software agent of the e-commerce application applies a current user state of the user to the ANN to determine a current safety value, and the software agent provides content to the user based on the current safety state and the current user state.

In an exemplary embodiment of the disclosure, a computer-implemented method for guiding an interaction between a user and an e-commerce application includes: generating a feature vector indicating a current user state of the user among a plurality of user states; applying the feature vector to an artificial neural network (ANN) to output a safety value for the current user state; generating content from one of a plurality of content items when the safety value indicates conversion; generating content from a subset of the content items when the safety value indicates churn; and presenting the generated content on a graphical user interface of the e-commerce application.

In an exemplary embodiment of the disclosure, a system for guiding an interaction between a user and an e-commerce application includes a client device and a server. The client device includes a user interface and a computer program configured to output state information of a user across a computer network based on an interaction of the user with the user interface. The server is configured to receive the state information from the computer network. The server includes a software agent configured to apply a feature vector based on the state information to an artificial neural network (ANN) to generate a safety value. The server generates content based on the state information and the safety value and outputs the content across the computer network. The user interface presents selectable options to the user based on the content.

In an exemplary embodiment of the disclosure, a computer-implemented method for includes: classifying trajectories representing sequences of user states into conversion trajectories and a non-conversion trajectories; dividing the trajectories into trajectory pairs each including one of the conversion trajectories and one of the non-conversion trajectories; generating partial-trajectory pairs of a same length from each of the trajectory pairs; and training an artificial neural network (ANN) using a first feature vector derived from one of the partial-trajectory pairs. The software agent is configured to apply a second feature vector to the trained ANN representing a user state of the user among the user states to generate a safety value and present content on a user interface of the e-commerce application based on the safety value.

BRIEF DESCRIPTION OF THE DRAWINGS

The detailed description describes one or more embodiments with additionally specificity and detail through use of the accompanying drawings, briefly described below.

FIG. 2 illustrates a method of training an ANN to calculate a safety value of a user state according to an exemplary embodiment of the disclosure.

FIG. 3A and FIG. 3B illustrate exemplary customer journeys that may be used to train the ANN.

FIG. 4 illustrates a method of determining an aggregate safety value that may be used to implement a step of the method of FIG. 2 according to an exemplary embodiment of the disclosure.

FIG. 5A, FIG. 5B, and FIG. 50 illustrate examples of the ANN calculating safety values according to an exemplary embodiment of the disclosure.

DETAILED DESCRIPTION OF THE EXEMPLARY EMBODIMENTS

An existing software tool creates uniquely tailored journeys for each and every customer, and an experience graph that maps out every possible customer journey. The software tool includes a software agent that is trained and tested data on collected offline before being deployed online. The software agent only exploits what it has already learned, and it is not possible for the software agent to explore and train online. Thus, the software agent cannot adjust for evolving preferences and trends. Further, allowing the software agent to explore while the mode is online is risky since learning mistakes have a higher cost when the model is online. Moreover, learning mistakes may lead to a higher subscription rates or lower engagement.

Accordingly, an embodiment of the disclosure provides a software agent that can explore and train while online and allows safe exploration. A safety value is learned for a given user state from past data collected offline. Learning mistakes can be minimized and an opportunity cost of online exploration can be reduced using the safety value. The software agent in an embodiment of the disclosure adjusts exploration in proportion to the safety value of the current user state. As a result, the software agent allows less exploration while the user is deemed to be in an "unsafe state", thereby reducing the risk and cost of online exploration.

The following terms are used throughout the present disclosure:

The term "conversion" refers to achieving a rewarding relationship with a company or gaining of the relationship. A conversion may occur when a user interacts with a website or application of the company and makes a purchase or subscribes to a service of the company.

The term "churn" or "non-conversion" refers to a failure to result in a rewarding relationship with a company or a loss of the relationship. A churn may occur when a user interacts with a website or application of the company and leaves without making a purchase or when an existing customer stops doing business with the company (e.g., canceled subscription, canceled membership, unsubscribes, etc.).

The term "trajectory" refers to an ordered sequence of user states or user actions that produces a positive result (e.g., conversion) or results in a negative (e.g., churn).

The term "software agent" refers to a computer program that acts for a user or other program in a relationship of agency and perform certain functions in autonomous manner.

The term "e-commerce" refers to the activity of electronically buying or selling products or services on online services or over the Internet.

The term "e-commerce platform" refers to computer software (e.g., an application) or a website that enables a user of a computer to perform an e-commerce transaction.

Figure 1:
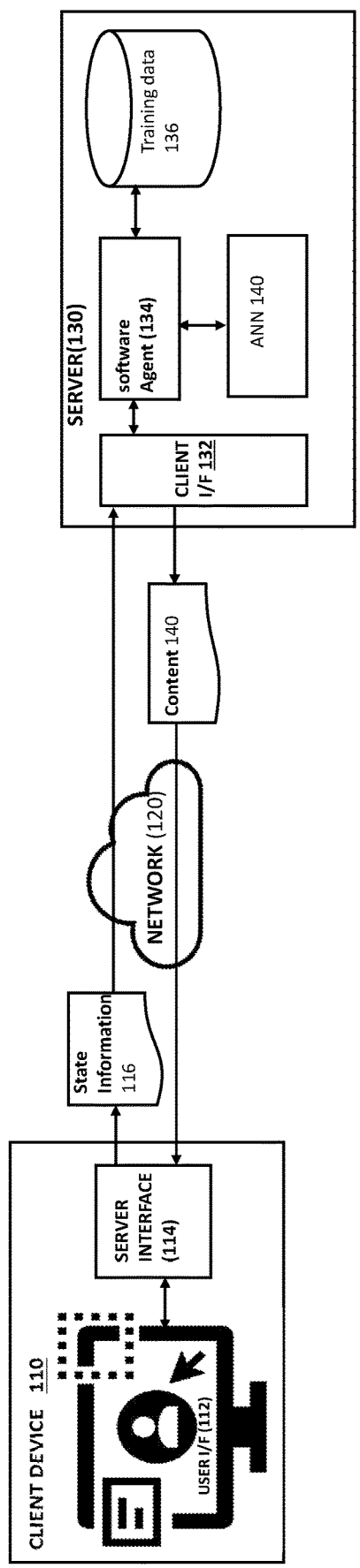
FIG. 1 is an illustration of an environment in an example implementation that is operable to employ techniques described herein.

Exemplary embodiments of the inventive concept are applicable to a client-server environment and a client-only environment. FIG. 1 shows an example of the client-server environment, where a user uses a graphical user interface 112 of a client device 110 to browse an e-commerce website of e-commerce platform or to interact with e-commerce application of the e-commerce platform based on presented information provided from a remote server 130. A server interface 114 of the client device 110 provides state information 116 of the user to the server 130. A software agent 134 of the server 130 guides or steers the user's experience (e.g., browsing experience) based on the state information 116. The software agent 134 attempts to steer the user towards safer states or away from unsafe states to increase the chances of a conversion or decrease the chances of churn (e.g., non-conversion). The server 130 provides content 140 to the client device 110 based on the state information 116. The server interface 114 generates the presented information based the content 140 for presentation on the graphical user interface 112.

The server interface 114 of the client device 110 sends the state information 116 across a computer network 120 and a client interface 132 of the server 130 receives the state information 116 from the computer network 120 and outputs the state information 116 to the software agent 134. The software agent 134 determines a current state of the user from among a plurality of available states based on the state information 116, applies the current state to an artificial neural network (ANN) 140 to determine a safety value, generates content 140 based on the current state and the safety value, and the client interface 132 provides the content 140 across the computer network 120 to the server interface 114. The client interface 132 may be part of an e-commerce platform. The ANN 140 was previously trained using training data 136. The training of the ANN 140 will be discussed in more detail below.

In an embodiment, the statement information 116 identifies one specific hyperlink the user has just selected from among a plurality of available hyperlinks. For example, if the currently viewed webpage has 9 hyperlinks, the user can reach one of 9 possible user states by selecting a given one of the hyperlinks. For example, if the user were to select the $3^{rd}$ hyperlink, the autonomous agent 134 could infer that the user is in a $3^{rd}$ user state. The content 140 may include information used by the server interface 114 to present a next webpage or popup menu in response to the user's current state. In an embodiment, the software agent 134 populates the content 140 with more selectable exploration options (e.g., a first number hyperlinks, advertisements, popup menus, etc.). In an embodiment, if the software agent 134 concludes that the current user state is safe, the software agent 134 populates the content 140 with less selectable exploration options (e.g., a second number of options less than the first number) to reduce the chances of churn.

According to an embodiment of the inventive concept in a client-only environment, the software agent 134 is present on the client device 110, and the client device 110 creates the content 140 without relying on the remote server 130. In this embodiment, the ANN 140 is located on the client device 110 or is accessible to the client device 110 across the computer network 120.

The computer network 120 may be wired, wireless, or both. The computer network 120 may include multiple networks, or a network of networks, but is shown in a simple form so as not to obscure aspects of the present disclosure. By way of example, the computer network 120 includes one or more wide area networks (WANs), one or more local area networks (LANs), one or more public networks, such as the Internet, and/or one or more private networks. Where the computer network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the computer network 120 is not described in significant detail.

The client device 110 is a computing device capable of accessing the Internet, such as the World Wide Web. The client device 110 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

The client device 110 includes one or more processors, and one or more computer-readable media. The computer-readable media may include computer-readable instructions executable by the one or more processors. The instructions may correspond to one or more applications, such as software to manage the graphical user interface 112 interface, software to output the state information 116 to the server 130, and software to receive the content 140 from the server 140.

The server 130 includes a plurality of computing devices configured in a networked environment or includes a single computing device. Each server computing device includes one or more processors, and one or more computer-readable media. The computer-readable media may include computer-readable instructions executable by the one or more processors. The instructions may correspond to one or more applications, such as software to interface with the client device 110 for receiving the state information 116 and sending the content 140.

FIG. 2 illustrates a method of training the ANN 140 to calculate a safety value from a user's current state according to an exemplary embodiment of the disclosure.

The method of FIG. 2 includes analyzing (e.g., by agent 134) trajectories to classify each as a conversion trajectory (e.g., sequence user states that led to a conversion) or a non-conversion trajectory (e.g., led to a churn) (step 201). The trajectories may be located within the training data 136 or stored in a database of the server 130 separate from the training data 136. In an embodiment, a trajectory is a sequence of user states from among a plurality of available user states.

Figure 3A:
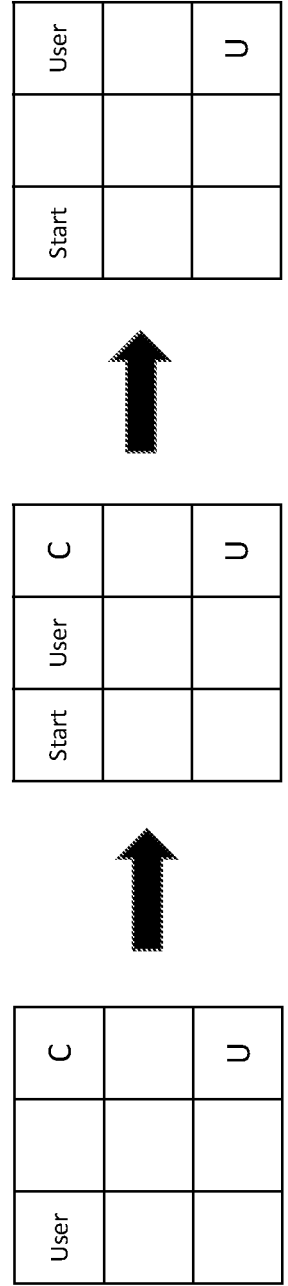

FIG. 3A and FIG. 3B illustrate examples where there are 9 possible user states, where each user state is represented by one of 9 boxes. In FIG. 3A, a first user sequentially reached user states 1, 2, and 3 leading to a conversion (C) trajectory of {1, 2, 3}. In FIG. 3B, a second user sequentially reached user states 1, 4, 5, 6, and 9 leading to an unsubscription (U) or non-conversion trajectory of {1, 4, 5, 6, 9}. For example, the software agent 134 could determine a trajectory to be a conversion trajectory when a last state of the trajectory corresponds to a hyperlink that places an item into a virtual shopping cart, purchases the item, subscribes to a service, etc. For example, the software agent 134 could determine a trajectory to be a non-conversion trajectory when a last state of the trajectory corresponds to a hyperlink that removes an item from the virtual shopping cart, cancels a purchase, unsubscribes from a service, etc. In another example, the software agent 134 could determine the type of the trajectory (e.g., conversion or non-conversion) based on a label previously manually assigned to the trajectory by a subject matter expert (SME). For example, the server 130 may include a user interface that enables the SME to view each of the trajectories and assign each a corresponding label such as "1", "conversion", "subscription", etc. to indicate a conversion and "0", "non-conversion", "churn", "unsubscription", etc. to indicate a non-conversion. For example, each of the trajectories could be stored as the training data 136 in a row of a table of a relational database including the corresponding sequence and label.

The method of FIG. 2 further includes dividing the classified trajectories into pairs each including one of the conversion trajectories and one of the non-conversion trajectories (step 202). For example, if there were 100 trajectories originally and 50 were conversion trajectories and 50 were non-conversion trajectories, the dividing would result in 50 pairs. For example, the conversion trajectory of FIG. 3A and the non-conversion trajectory of FIG. 3B could correspond to one of the pairs.

The method of FIG. 2 further includes generating partial-trajectory pairs of a same length from each of the trajectory pairs (step 203). In an embodiment, the length is an integer greater than 1 that is less than the length of a trajectory of a pair. For example, when the length is 2, a partial-trajectory pair with respect to the pair of trajectories shown in FIG. 3A and FIG. 3B could include a conversion partial trajectory of {2,3} and a non-conversion partial-trajectory of {6,9}. A process for generating a partial-trajectory pair from a given trajectory pair may be applied numerous times to the given trajectory pair to generate different combinations of partial trajectory pairs (e.g., {5,9}, {4,9}, etc.), especially when trajectories have numerous sequential steps.

The method of FIG. 2 further includes generating a feature vector from a partial-trajectory pair and applying the feature vector to the ANN to generate an aggregate conversion safety value for a conversion partial-trajectory of the pair and an aggregate non-conversion safety value for a non-conversion partial trajectory of the pair (step 204). Step 204 will be described below with respect to FIG. 4 in more detail.

The method of FIG. 2 further includes determining whether the aggregate conversion safety value is larger than the aggregate non-conversion safety value (step 205). If the ANN 140 is trained sufficiently, the aggregate conversion safety value will be larger than the aggregate non-conversion safety value to indicate that the partial-trajectory associated with the aggregate conversion safety value is likely to result in a conversion. However, if the ANN 140 is not trained sufficiently, sometimes the aggregate conversion safety value will be smaller than the aggregate non-conversion safety value. When this occurs, this information can be used as feedback to adjust the weights of the ANN 140 so that when the ANN 140 is applied to the same feature vector, the ANN 140 it will output the aggregate conversion safety value to be higher than the aggregate non-conversion safety value.

The method of FIG. 2 further includes adjusting the weights of the ANN so that the ANN calculates the aggregate conversion safety value to be larger than the aggregate non-conversion safety value (step 206) when the aggregate conversion safety value is determined to be smaller than the aggregate non-conversion safety value. If the aggregate conversion safety value is determined to be greater than the aggregate non-conversion safety value, the method of FIG. 2 can resume to step 204 to operate on a next one of the partial-trajectory pairs.

FIG. 4 illustrates a method of implementing step 204 according to an exemplary embodiment of the disclosure to generate the feature vector from a partial-trajectory pair and apply the feature vector to the ANN to generate the aggregate safety values.

Figure 5A:
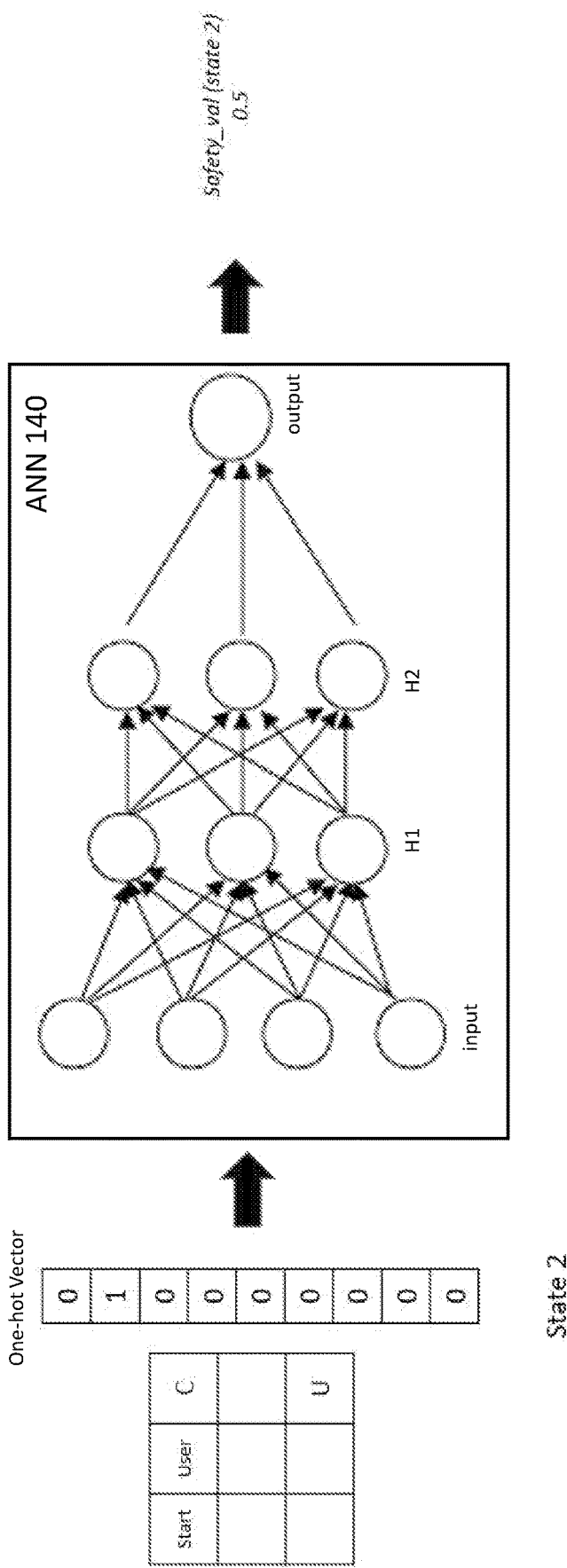
Figure 5B:
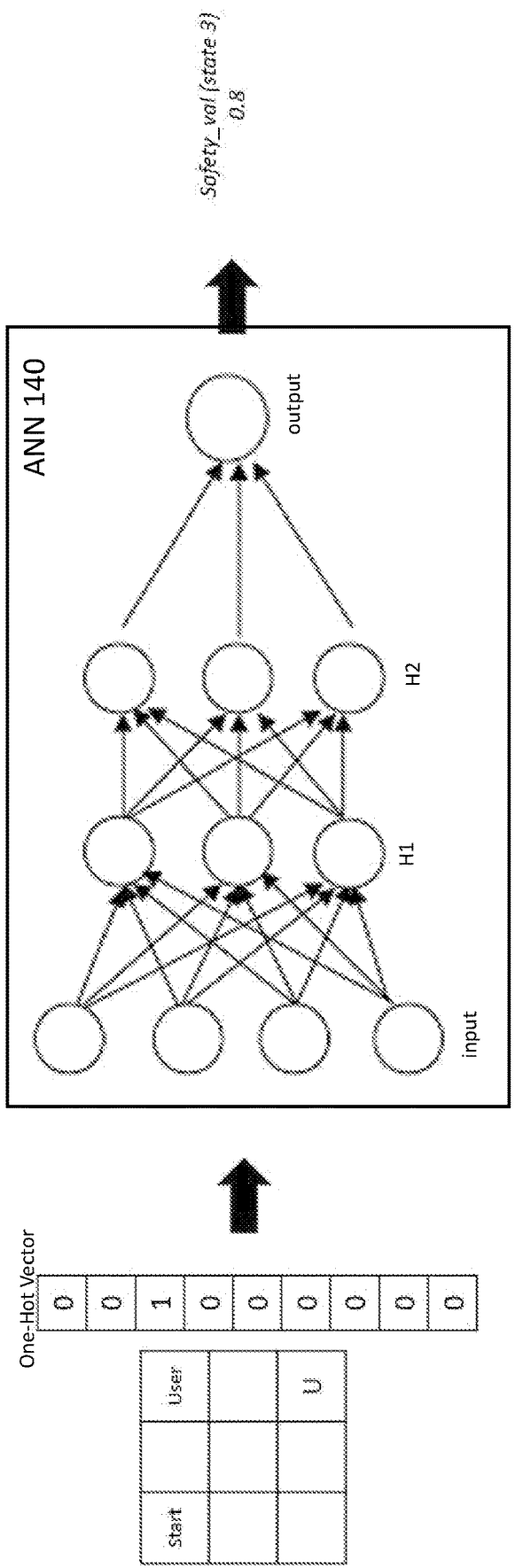

The method of FIG. 4 includes converting a partial-trajectory of the partial trajectory pair into one-hot vectors (step 401). FIG. 5A and FIG. 5B illustrates an example of the conversion partial-trajectory {2,3} being used to generate an aggregate safety value. In this example, since there are 9 possible states, the one-hot vector includes 9 bits. One bit of the one-hot vector is set to represent the current state and the remaining bits are 0. In FIG. 5A, the second bit of the one-hot vector of the conversion partial-trajectory is set (1) and the remaining bits are clear (0) because 2 is first within the partial-trajectory {2, 3}. In FIG. 5B, the third bit of the one-hot vector of the conversion partial-trajectory is set (1) and the remaining bits are clear (0) because 3 is second within the partial-trajectory {2, 3}.

The method of FIG. 4 further includes applying each of the one-hot vectors to an ANN to generate safety values (step 402). Each one-hot vector applied to the ANN 140 may be referred to as feature vector. As shown in FIGS. 5A and 5B, the ANN 140 includes an input layer, hidden layers H1 and H2, and an output layer. In an exemplary embodiment, the input layer includes a ReLU activation function, the first hidden layer H1 includes a ReLU activation function, and the second hidden layer includes a Tan h activation function. However, layers of the ANN may have different activation functions from those described above in alternate embodiments. While the ANN 140 is illustrated as including two hidden layers, embodiments of the disclosure are not limited thereto. For example, the ANN 140 may include a single hidden layer or more than two hidden layers. In an exemplary embodiment, the ANN 140 has been configured to output a value ranging from −1 to 1, where −1 is least safe and 1 is most safe. In FIG. 5A, application of the one-hot vector associated with state 2 results in a safety value of 0.5. In FIG. 5B, application of the one-hot vector associated with state 3 results in a safety value of 0.8.

The method of FIG. 4 further includes generating an aggregate safety value from the generated safety values (step 403). In an exemplary embodiment, the aggregate safety value is generated by adding the generated safety values together. In another exemplary embodiment, the aggregate safety value is generated by considering a discount factor γ so that earlier states have a higher weight than later states in the calculation. The discount factor γ may be raised to an increasing exponent and applied sequentially to the safety values of a partial-trajectory while calculating the aggregate safety value. For example, if the partial-trajectory includes three states, the discount factor γ is raised to a power of 0 ($\gamma^0$) and multiplied by the safety value of the first user state of the partial-trajectory to generate a first value, the discount factor γ is raised to a power of 1 ($\gamma^1$) and multiplied by the safety value of the second user state of the partial-trajectory to generate a second value, the discount factory is raised to a power of 2 ($\gamma^2$) and multiplied by the safety value of the third user state of the partial-trajectory to generate a third value, and the first through third values are added together to generate the aggregate safety value. In the example of FIG. 5A and FIG. 5B, when the discount factor γ is 0.9, since there are only two states, an aggregate safety value safety_val of 1.22 is generated because safety_val(state 2)+γ*safety_val(state 3)=0.5+0.9*0.8=1.22.

The method of FIG. 4 is then repeated for the other partial-trajectory of the partial trajectory pair to generate the aggregate safety value of the non-conversion partial trajectory. For example, the aggregated safety value of the conversion partial trajectory is generated using FIG. 5A and FIG. 5B, and the method of FIG. 4 is applied to the non-conversion partial trajectory of {6,9} to generate the non-conversion aggregate safety value. FIG. 5C shows an example of safety values of 0.75 and 0.95 generated from the non-conversion partial trajectory and the non-conversion aggregate safety value of 1.60 generated from these safety values. Since the non-conversion aggregate safety value of 1.60 is greater than the conversion aggregate safety value of 1.22, step 205 of the method of FIG. 2 is performed to adjust the weights of the ANN 140.

Figure 6:
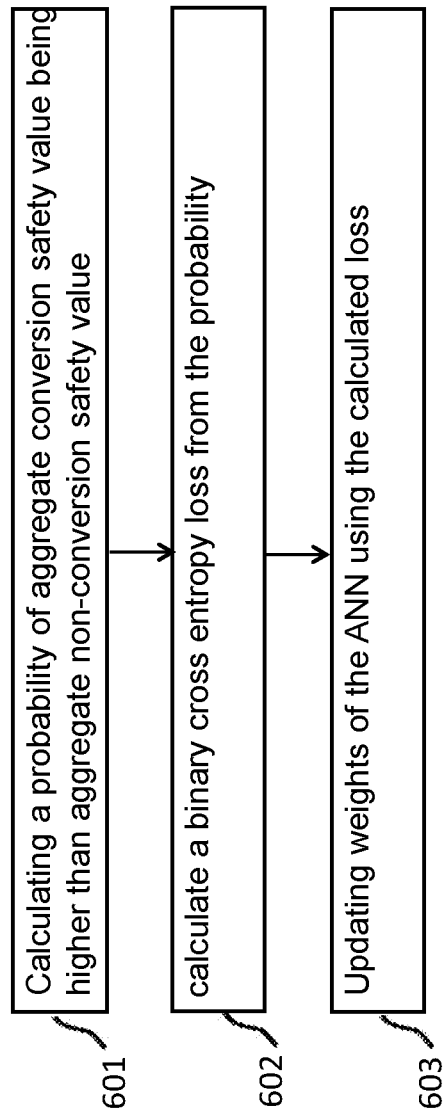
FIG. 6 illustrates a method of updating weights of the ANN according to an exemplary embodiment of the disclosure.

FIG. 6 illustrates a method of adjusting the weights according to an exemplary embodiment of the disclosure, which may be used to perform step 205.

The method of FIG. 6 includes calculating a probability of the conversion aggregate safety value being higher than the non-conversion aggregate safety value (step 601). The task is to learn an aggregate safety value of a conversion partial-trajectory to be higher than an aggregate safety value of a non-conversion partial trajectory. The below Equation 1 can be used to calculate the probability p when the aggregate safety value of the conversion partial-trajectory is represented by +ve agg and the aggregate safety value of the non-conversion partial-trajectory is represented by −ve agg.

$$p=\exp(+ve\ agg)/(\exp(+ve\ agg)+\exp(-ve\ agg)) \qquad \text{Equation 1.}$$

For example, when +ve agg is 1.22 and −ve is 1.60, then the above Equation 1 results in $(e^{1.22})/(e^{1.22}+e^{1.60})=0.405$.

The method of FIG. 6 further includes calculating a binary cross entropy (BCE) loss from the probability (step 602). In an exemplary embodiment, the BCE loss is generated by the below Equation 2.

$$\text{Loss}=-p*\log(p) \qquad \text{Equation 2.}$$

For example, when p=0.405, the Loss is −0.405*(log (0.405))=−0.366.

The method of FIG. 6 further includes updating weights of the ANN using the loss (step 603). In an embodiment, the loss is minimized using an Adam optimizer. Minimization may be performed by applying a gradient descent on an old weight $w_{old}$ of the ANN 140 to generate a new weight $w_{new}$ according to below Equation 3.

$$w_{new}=w_{old}-\alpha*\partial(\text{loss})/\partial w \qquad \text{Equation 3,}$$

where α is a step size (e.g., 0.1) and derivative ∂/∂w denotes how the loss changes with a change in weight value. The weights of the ANN 140 may be updated many times during the training. Eventually, the weights receive values so that the aggregate safety value of a conversion partial-trajectory of a pair is higher than the aggregate safety value of a non-conversion partial trajectory of the pair. For example, if $w_{old}$=1, and ∂(loss)/∂w=0.5, then $w_{new}=w_{old}-\alpha*\partial(\text{loss})/\partial w$=1−0.1*0.5=0.95. Similarly, all of the weights of the ANN 140 are updated to minimize the loss.

In an embodiment, the ANN 140 is configured to output a safety value ranging from −1 to 1 upon input of a one-hot vector representing a selected user state from among a plurality of available user states. For example, a safety value of 0.9 indicates that a conversion is very likely when the user is in this state (e.g., a safe state), and a safety value of −0.95 indicates that conversion is extremely unlikely or than an un-subscription is very likely when the user is in this state (e.g., a risky state). The safety value is an indicator of riskiness of the user state. In an embodiment, the software agent 134 is configured to enable the user to explore more states when the user is in a safe state and to explore to fewer states when the user is in the risky state.

The software agent 134 has a list of different content items (e.g., webpages, menus, advertisements, etc.) to present to a user based on their current user state. In an embodiment, the software agent 134 selects a given content item from among a plurality of content items associated with a given user state to present to the user as the content 140 when the user reaches the given user state and the given user state is deemed to be a safe state. However, if the given user state is calculated to be a risky state using the ANN 140, the agent 134 chooses one of the content items from a subset of the content items that is considered to be more reliable for users that are considering unsubscribing or not making a purchase.

For example, one of the content items in the subset could be an advertisement offering the user a 25% discount for subscribing while a content item outside the subset could be an advertisement offering a much smaller discount such as 5%. If the given user state is calculated to be a safe state, the agent 134 may select the content item randomly by choosing a random one of the riskier content items located outside the subset or choose one of the safer content items that is located inside the subset according to a probability derived from a safety value of the given user state and an exploration constant E. In an embodiment, the agent 134 controls exploration of the user based on the exploration constant $\epsilon$ that ranges from 0 to 1. For example, the exploration constant $\epsilon$ of 0.1 means 10% of the time the software agent 134 allows an exploratory action to be performed (e.g., random selection of content items located outside the subset), and 90% of the time, the software agent 134 does not allow an exploratory action to be performed (e.g., chooses one of the safer content items located inside the subset). Allowing an exploratory action may mean presenting the user with a content item randomly or providing a user with a webpage including a first number hyperlinks, whereas not allowing an exploratory action may mean presenting the user with a content item from a list of reliable content items or with a webpage including a second number of hyperlinks less than the first number. In an exemplary embodiment, the exploration constant $\epsilon$ has an initial value that is adjusted based on the safety value of the current user state. For example, a new exploration constant $\epsilon_{new}$ is generated from the prior exploration constant $\epsilon_{old}$ and the safety value Safety_value using Equation 4.

$$\epsilon_{new}=\epsilon_{old}*(1+\text{Safety\_value}) \quad \text{Equation 4.}$$

For example, if $\epsilon_{old}$ is 0.1, and the Safety_value is −0.95, then the new exploration constant $\epsilon_{new}$=0.1 (1−0.95)=0.005 or 0.5% exploration allowed, thereby causing a great reduction in exploration. Reducing exploration in this manner may minimize the number of learning mistakes and hence the opportunity cost of exploration.

In an exemplary embodiment, the software agent 134 chooses content based on the calculated safety value or based on the calculated safety value and the exploration constant, generates content 140 including the chosen content, the agent software 134 sends the content 140 across the computer network 120 to the client device 110, and the client device 110 presents the content 140 or information derived from the content 140. For example, if the user of the client device 110 had previously selected a hyperlink associated with a given user state, the client device 110 sends state information 116 to the server 130 indicating the given user state, the agent 134 applies a feature vector based on the given user state to the ANN 140 to output a safety value, the agent 134 determines the content 140 based on the safety value, the server 130 sends the content 140 to the client device 110, and the user interface 112 of client device 110 presents information based on the content 140 in response to the user selecting the hyperlink.

As discussed above, at least one embodiment of the disclosure provides a computer-implemented method for guiding an interaction between a user and an e-commerce platform that includes applying a feature vector to an ANN to generate a safety value, generating of content from one of a plurality of content items when the safety value indicates conversion or generating content from a subset of the content items when the safety value indicates churn.

In an embodiment of the method, the generating of the content from one of the plurality of content items including generating the content from a random one of the content items located outside the subset, according to a probability derived from the safety value and a constant (e.g., the constant*(1+the safety value)).

In an embodiment, the method further includes training the ANN on a plurality of trajectory pairs prior to the applying of the feature vector, where each trajectory pair includes a first sequence of user states that resulted in conversion and a second other sequence of the user states that resulted in churn.

In an embodiment, the training includes: generating a conversion partial-trajectory of a length from the first sequence; generating a non-conversion partial-trajectory of the length from the second sequence; and training the ANN using the conversion partial-trajectory and the non-conversion partial-trajectory.

In an embodiment, the training further includes: applying each of the partial-trajectories to the ANN to generate an aggregate conversion safety value and an aggregate non-conversion safety value; and adjusting weights of the ANN when the aggregate conversion safety value is less than the aggregate non-conversion safety value. In an embodiment, the adjusting causes the ANN to subsequently output the aggregate conversion safety value greater than the aggregate non-conversion safety value.

In an embodiment of the method, the applying includes: applying a first user state of a given partial-trajectory among the partial-trajectories to the ANN to calculate a first value; applying a second user state of the given partial trajectory to the ANN to calculate a second value; and summing the first and second values to generate one of the aggregate safety values corresponding to the given partial-trajectory.

In another embodiment of the method, the applying includes: applying a first user state of a given partial-trajectory among the partial-trajectories to the ANN to calculate a first value; applying a second user state of the given partial-trajectory to the ANN to calculate a second value; multiplying the second value by a discount factor to generate a third value; and summing the first and third values to generate one of the aggregate safety values corresponding to the given partial-trajectory.

In an embodiment of the method, the adjusting includes: calculating a probability of the aggregate conversion safety value being higher than the aggregate non-conversion safety value; calculating a binary cross entropy loss from the probability; and updating the weights of the ANN using the calculated loss.

In an embodiment of the method, the conversion indicates a sale or subscribing to a service and the churn indicates cancelling of the sale, or the unsubscribing from the service.

As discussed above, at least one embodiment of the disclosure provides a system for guiding an interaction between a user and an e-commerce platform that applies a feature vector to an ANN to generate a safety value and a user interface to present selectable options.

In an embodiment of the system, the selectable options include a first number of options when the safety value indicates a conversion and includes a second number of options less than the first number when the safety value indicates a churn.

In an embodiment of the system, the feature vector indicates a current user state of the user among a plurality of user states.

In an embodiment of the system, the ANN is trained on a plurality of trajectory pairs, where each trajectory pair includes a first sequence of the user states that resulted in conversion and a second other sequence of the user states that resulted in churn.

As discussed above, at least one embodiment of the disclosure provides a method that trains an ANN using partial-trajectory pairs of a same length, uses a software agent to apply a feature vector to the trained ANN to generate a safety value, and use of the software agent to present content based on the safety value.

In an embodiment of the method, each partial-trajectory pair includes a conversion partial-trajectory and a non-conversion partial-trajectory, and the training applies a first vector of the conversion partial-trajectory to the ANN to generate an aggregate conversion safety value and applies a second vector of the non-conversion trajectory to the ANN to generate an aggregate non-conversion safety value and adjusts weights of the ANN using the aggregate safety values.

In an embodiment of the method, the weights are adjusted when the aggregate non-conversion safety value is less than the aggregate non-conversion safety value.

In an embodiment of the method, the content provides a user with a first number of selectable options when the safety value is positive and a second number of selectable options less than the first number when the safety value is negative.

Figure 7:
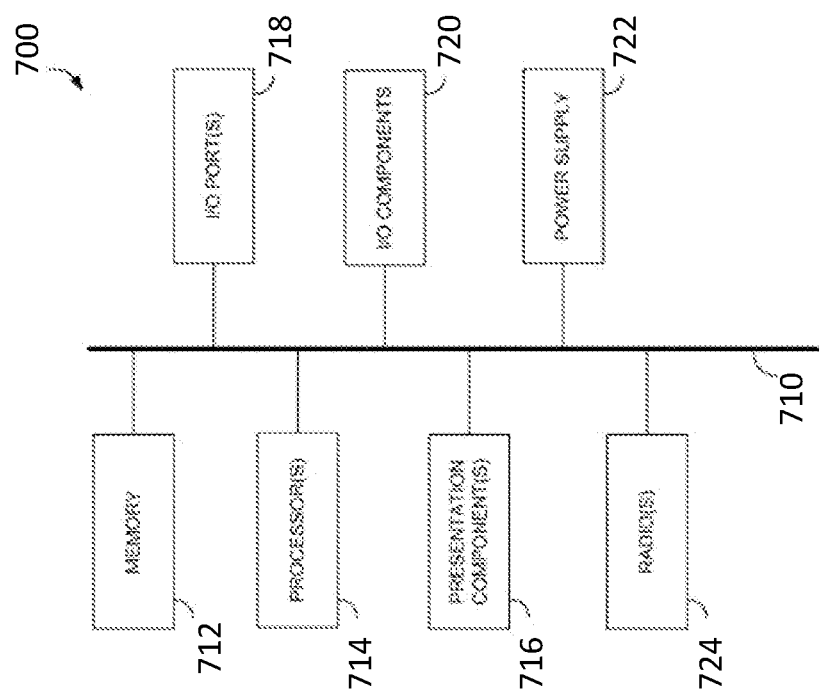
FIG. 7 illustrates an exemplary computing device used to perform one or more methods of the disclosure.

Having described implementations of the present disclosure, an exemplary operating environment in which embodiments of the present invention may be implemented is described below to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). For example, one may consider a presentation component such as a display device to be an I/O component. The diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. For example, the state information 116, the content 140, and the content items may be stored in the memory 712 when the server 130 is implemented by computing device 700. The computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as, stereoscopic camera systems, infrared camera systems, RGB camera systems, and combinations of these for gesture detection and recognition.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computer-implemented method for guiding an interaction between a user and an e-commerce platform, the method comprising:
    generating a feature vector indicating a current user state of the user among a plurality of user states;
    applying the feature vector to an artificial neural network (ANN) to output a safety value for the current user state;
    generating content from one of a plurality of content items when the safety value indicates conversion;
    generating content from a subset of the content items when the safety value indicates churn; and
    presenting the generated content on a graphical user interface of the e-commerce platform.

2. The computer-implemented method of claim 1, wherein the generating of the content from one of the plurality of content items comprises generating the content from a random one of the content items located outside the subset, according to a probability derived from the safety value and a constant.

3. The computer-implemented method of claim 2, wherein the probability is (the constant*(1+the safety value).

4. The computer-implemented method of claim 1, further comprising:
    training the ANN on a plurality of trajectory pairs prior to the applying of the feature vector, where each trajectory pair includes a first sequence of the user states that resulted in conversion and a second other sequence of the user states that resulted in churn.

5. The computer-implemented method of claim 4, wherein the training of the ANN on the plurality of trajectory pairs comprises:
    generating a conversion partial-trajectory of a length from the first sequence;
    generating a non-conversion partial-trajectory of the length from the second sequence; and
    training the ANN using the conversion partial-trajectory and the non-conversion partial-trajectory.

6. The computer-implemented method of claim 5, wherein the training of the ANN using the conversion partial-trajectory and the non-conversion partial-trajectory comprises:
    applying each of the partial-trajectories to the ANN to generate an aggregate conversion safety value and an aggregate non-conversion safety value; and
    adjusting weights of the ANN when the aggregate conversion safety value is less than the aggregate non-conversion safety value.

7. The computer-implemented method of claim 6, wherein the adjusting causes the ANN to subsequently output the aggregate conversion safety value greater than the aggregate non-conversion safety value.

8. The computer-implemented method of claim 6, wherein the applying of each of the partial-trajectories to the ANN comprises:
    applying a first user state of a given partial-trajectory among the partial-trajectories to the ANN to calculate a first value;
    applying a second user state of the given partial trajectory to the ANN to calculate a second value; and
    summing the first and second values to generate one of the aggregate safety values corresponding to the given partial-trajectory.

9. The computer-implemented method of claim 6, wherein the applying of each of the partial-trajectories to the ANN comprises:
    applying a first user state of a given partial-trajectory among the partial-trajectories to the ANN to calculate a first value;
    applying a second user state of the given partial-trajectory to the ANN to calculate a second value;
    multiplying the second value by a discount factor to generate a third value; and
    summing the first and third values to generate one of the aggregate safety values corresponding to the given partial-trajectory.

10. The computer-implemented method of claim 6, wherein the adjusting of the weights comprises:
    calculating a probability of the aggregate conversion safety value being higher than the aggregate non-conversion safety value;
    calculating a binary cross entropy loss from the probability; and
    updating the weights of the ANN using the calculated loss.

11. The computer-implemented method of claim 1, wherein the conversion indicates a sale and the churn indicates cancelling of the sale.

12. The computer-implemented method of claim 1, wherein the conversion indicates subscribing to a service and the churn indicates unsubscribing from the service.

13. A system for guiding an interaction between a user and an e-commerce platform, the system comprising:
    a client device comprising a user interface and a computer program configured to output state information of a user across a computer network based on an interaction of the user with the user interface; and
    a server configured to receive the state information from the computer network,
    wherein the server comprises a software agent configured to apply a feature vector based on the state information to an artificial neural network (ANN) to generate a safety value,
    wherein the server generates content based on the state information and the safety value and outputs the content across the computer network, and
    wherein the user interface presents selectable options to the user based on the content.

14. The system of claim 13, wherein the selectable options include a first number of options when the safety value indicates a conversion and includes a second number of options less than the first number when the safety value indicates a churn.

15. The system of claim 13, wherein the feature vector indicates a current user state of the user among a plurality of user states.

16. The system of claim 15, wherein the ANN is trained on a plurality of trajectory pairs, where each trajectory pair includes a first sequence of the user states that resulted in conversion and a second other sequence of the user states that resulted in churn.

17. A computer-implemented method for training a software agent to guide an interaction of a user with an e-commerce platform, the method comprising:
   classifying trajectories representing sequences of user states into conversion trajectories and a non-conversion trajectories;
   dividing the trajectories into trajectory pairs each including one of the conversion trajectories and one of the non-conversion trajectories;
   generating partial-trajectory pairs of a same length from each of the trajectory pairs; and
   training an artificial neural network (ANN) using a first feature vector derived from one of the partial-trajectory pairs,
   wherein the software agent is configured to apply a second feature vector to the trained ANN representing a user state of the user among the user states to generate a safety value and present content on a user interface of the e-commerce platform based on the safety value.

18. The computer-implemented method of claim 17, wherein each partial-trajectory pair comprises a conversion partial-trajectory and a non-conversion partial-trajectory, and the training applies a first vector of the conversion partial-trajectory to the ANN to generate an aggregate conversion safety value and applies a second vector of the non-conversion trajectory to the ANN to generate an aggregate non-conversion safety value and adjusts weights of the ANN using the aggregate safety values.

19. The computer-implemented method of claim 18, wherein the weights are adjusted when the aggregate non-conversion safety value is less than the aggregate non-conversion safety value.

20. The computer-implemented method of claim 17, wherein the content provides the user with a first number of selectable options when the safety value is positive and a second number of selectable options less than the first number when the safety value is negative.

* * * * *